(12) United States Patent  
Takahashi (10) Patent No.: US 8,470,418 B2
(45) Date of Patent: Jun. 25, 2013

(54) EXHAUST PIPE FOR INTERNAL COMBUSTION ENGINE, AND INTERNAL COMBUSTION ENGINE AND TRANSPORTATION APPARATUS INCORPORATING THE SAME

(75) Inventor: Naohisa Takahashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1130 days.

(21) Appl. No.: 11/470,098

(22) Filed: Sep. 5, 2006

(65) Prior Publication Data

US 2007/0074777 A1 Apr. 5, 2007

(30) Foreign Application Priority Data

Sep. 6, 2005 (JP) .................................. 2005-258035

(51) Int. Cl.
*B32B 1/08* (2006.01)
*B32B 18/00* (2006.01)
*B32B 1/02* (2006.01)

(52) U.S. Cl.
USPC ....... 428/34.4; 428/34.1; 428/34.2; 428/35.7; 428/35.9; 428/36.9

(58) Field of Classification Search
USPC ............... 428/34.1, 34.2, 34.4, 35.7, 35.9, 428/36.9
See application file for complete search history.

(56) References Cited

U.S. PATENT DOCUMENTS

| 4,356,885 | A | 11/1982 | Dello |
| 5,897,754 | A * | 4/1999 | Fujii et al. ................. 204/192.12 |
| 6,013,582 | A * | 1/2000 | Ionov et al. .................... 438/738 |
| 6,661,096 | B1 | 12/2003 | Takayama et al. |
| 2003/0180571 | A1 | 9/2003 | Singh |
| 2004/0197679 | A1 | 10/2004 | Yoshikawa et al. |
| 2006/0010862 | A1 | 1/2006 | Takahashi |

FOREIGN PATENT DOCUMENTS

| EP | 1617125 A2 | 1/2006 |
| JP | 59-63317 A | 4/1984 |
| JP | 02-13700 A | 4/1990 |
| JP | 03-249313 A | 11/1991 |
| JP | 04-041660 A | 2/1992 |
| JP | 05-098422 A | 4/1993 |
| JP | 06-228502 A | 8/1994 |
| JP | 06-228733 A | 8/1994 |
| JP | 06-279975 A | 10/1994 |
| JP | 07-102967 A | 4/1995 |
| JP | 08-067980 A | 3/1996 |

(Continued)

OTHER PUBLICATIONS

Takahashi, "Exhaust Pipe for Internal Combustion Engine," U.S. Appl. No. 11/177,088, filed Jul. 8, 2005.

(Continued)

*Primary Examiner* — Marc Patterson
(74) *Attorney, Agent, or Firm* — Keating & Bennett, LLP (57) ABSTRACT

An exhaust pipe for an internal combustion engine includes a metal tube enclosing a passage through which an exhaust gas from the internal combustion engine passes, and a ceramic film covering the metal tube from the outside, the ceramic film containing no more than about 0.5 mass % of a metallic element which is dominantly present in a surface of the metal tube. The ceramic film is an SiON film containing about 30 mass % or less of O and about 10 mass % or more of N.

15 Claims, 9 Drawing Sheets

FOREIGN PATENT DOCUMENTS

| | | |
|---|---|---|
| JP | 09-104961 A | 4/1997 |
| JP | 09-279330 A | 10/1997 |
| JP | 10-238320 A | 9/1998 |
| JP | 2823169 B | 9/1998 |
| JP | 11-158561 A | 6/1999 |
| JP | 2000-200786 A | 7/2000 |
| JP | 2000-303833 A | 10/2000 |
| JP | 2000-337126 A | 12/2000 |
| JP | 3151713 B | 1/2001 |
| JP | 2001-106155 A | 4/2001 |
| JP | 2001-295075 A | 10/2001 |
| JP | 2001-329376 A | 11/2001 |
| JP | 2002-083812 A | 3/2002 |
| JP | 3088978 U | 7/2002 |
| JP | 2002-276359 A | 9/2002 |
| JP | 2002-332838 A | 11/2002 |
| JP | 2003-049265 A | 2/2003 |
| JP | 2003-243388 A | 8/2003 |
| JP | 2004-115907 A | 4/2004 |
| JP | 2004-318088 A | 11/2004 |
| JP | 2004-332003 A | 11/2004 |
| JP | 2005-153126 A | 6/2005 |

OTHER PUBLICATIONS

Official communication issued in a counterpart Chinese Application No. 2005100841582, mailed on Mar. 9, 2007.

Official Communication issued in the corresponding European Application No. 06018349.8, mailed on Dec. 4, 2006.

Itou; "Titanium Part for Internal Combustion Engine"; U.S. Appl. No. 11/425,903, filed Jun. 22, 2006.

Official Communication issued in corresponding Japanese Patent Application No. 2006-228380, mailed on Aug. 18, 2009.

* cited by examiner

EXHAUST PIPE FOR INTERNAL COMBUSTION ENGINE, AND INTERNAL COMBUSTION ENGINE AND TRANSPORTATION APPARATUS INCORPORATING THE SAME

BACKGROUND OF THE INVENTION

1. Field of the Invention

The present invention relates to an exhaust pipe for an internal combustion engine, the exhaust pipe being used for guiding along an exhaust gas which is generated in the internal combustion engine. More particularly, the present invention relates to an exhaust pipe for an internal combustion engine such that at least a portion of the exhaust pipe appears on the exterior of a vehicle which incorporates the internal combustion engine.

2. Description of the Related Art

In many motorcycles or the like incorporating an internal combustion engine, the internal combustion engine is exposed in such a manner that the exterior appearance of the internal combustion engine can contribute to the aesthetic design of the motorcycle. In such a motorcycle, an exhaust pipe for guiding along exhaust gas from the internal combustion engine also plays an important role in the design of the motorcycle. Even in the case where the internal combustion engine is covered by a cowl or the like, the exhaust pipe is not likely to be completely covered by a cowl or a protector. Rather, it is often the case that at least a portion of the exhaust pipe appears on the exterior to become a part of the motorcycle design.

Figure 14:
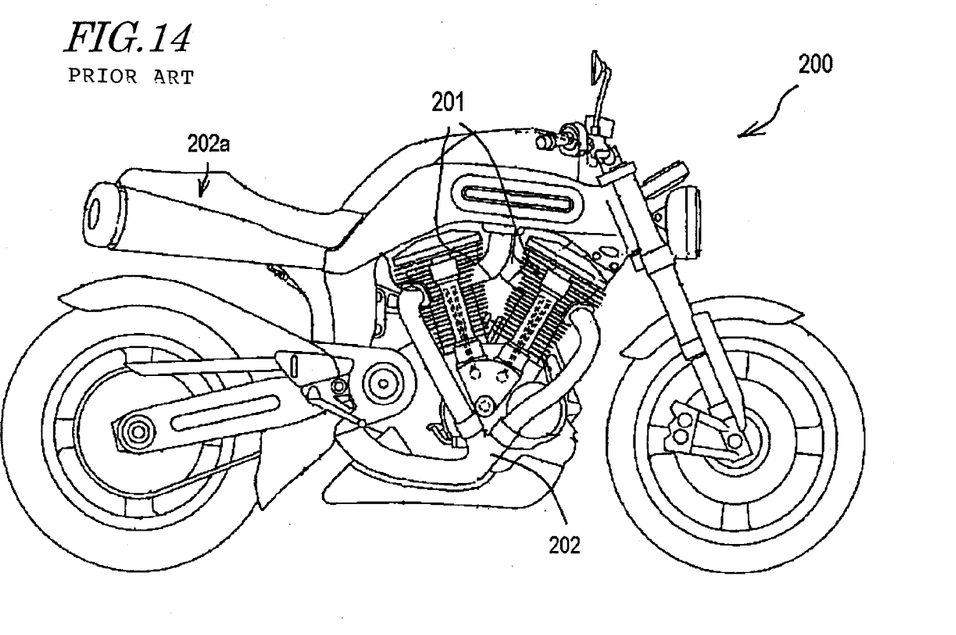
FIG. 14 is a side view showing the exterior appearance of a motorcycle.

FIG. 14 is a side view showing an example of a sports-type motorcycle. A motorcycle 200 shown in FIG. 14 includes a V-type engine 201 and an exhaust pipe 202 for guiding along exhaust gas. Two cylinders of the V-type engine 201 become united into the single exhaust pipe 202, which extends toward and above the rear wheel so as to allow exhaust gas to be discharged at the rear portion of the body. In the present specification, an "exhaust pipe" means the entirety of any structure which composes a channel for guiding along the exhaust gas from the internal combustion engine, and may include any portion defining a muffler 202a or the like.

In general, the exhaust pipe 202 must have a certain thickness for allowing the exhaust gas generated in the internal combustion engine 201 to be efficiently discharged. Moreover, the portion constituting the muffler 202a has an increased diameter in order to accommodate the muffling structure. For this reason, the exhaust pipe accounts for a relatively large part of the exterior appearance of the entire motorcycle, and thus, the shape and color of the exhaust pipe have an impact on the entire motorcycle design.

For these reasons, the shape and color of the exhaust pipe are important factors in determining the entire motorcycle design. Therefore, it is common to construct the exhaust pipe in a smoothly bent shape to present a strong and voluminous impression, or finish the surface of the exhaust pipe with a lustered metal color or finish for an enhanced contrast against the other component parts. It is also common to finish the exhaust pipe surface with a similar color tone to those of the other component parts to obtain a consistent look with the surrounding structures.

In general, an exhaust pipe is formed of carbon steel tubes for machine structural purposes (STKM), stainless steel (SUS), titanium, or the like. In the case of an exhaust pipe composed of STKM, the surface of the exhaust pipe is often plated with chromium for better esthetics.

However, the exhaust gas traveling through the exhaust pipe, which comes directly from the internal combustion engine, has a high temperature. Therefore, when the exhaust gas passes the exhaust pipe, the exhaust pipe reaches a high temperature, as a result of which the chromium-plated pipe surface may be discolored, oxidized, or otherwise deteriorated. In particular, some regions may suffer from blue-violet or reddish-brown discoloration. Moreover, even in the case of an exhaust pipe which has been formed of SUS or titanium without being chromium-plated, the surface may still be colored blue-violet or reddish-brown due to high temperature, the generated oxide film may peel, and/or change in color tone may result due to oxide film formation.

Thus, due to blue-violet or reddish-brown discoloration or surface deterioration of an exhaust pipe having metallic luster, there occurs a problem in that the exterior appearance of the entire motorcycle design is degraded. This problem has become particularly significant in the recent years because the performance of internal combustion engines has been improved, resulting in an increased temperature of the exhaust gas.

This problem may be addressed by preventing the temperature of the exhaust pipe surface from becoming too high, by adopting a two-fold or three-fold cylindrical structure for the exhaust pipe. However, even by using a two-fold or three-fold cylindrical structure, the temperature of the exhaust pipe surface will not be adequately reduced, and surface oxidation or deterioration due to heat will not be completely prevented. Moreover, in this case, there is another problem in that the outer dimensions of the exhaust pipe are increased.

Discoloration, oxidation, or deterioration of the exhaust pipe surface may be addressed by covering the exhaust pipe with a cowl or a protector so that the exhaust pipe will not show on the exterior. However, in this case, the exhaust pipe does not contribute to the entire motorcycle design, thus making it difficult to pursue a desired characteristic beauty and aesthetic quality of a motorcycle.

In order to solve the above-described problems, the inventor has proposed forming a silicon oxide film on the surface of an exhaust pipe in order to prevent discoloration of the exhaust pipe (Japanese Laid-Open Patent Publication No. 2002-332838). As disclosed in Japanese Laid-Open Patent Publication No. 2002-332838, by forming a silicon oxide film having a thickness of about 0.05 μm or more on the surface of an exhaust pipe through sol-gel processing, it becomes possible to obtain an exhaust pipe which is unlikely to suffer from discoloration even when heated to a temperature of about 400° C.

However, it has been found that an exhaust pipe which is obtained by the technique disclosed in Japanese Laid-Open Patent Publication No. 2002-332838 may suffer from drastic surface discolorations due to exposure to a temperature exceeding 400° C. Therefore, discoloration may not be sufficiently prevented in the case where an exhaust pipe disclosed in Japanese Laid-Open Patent Publication No. 2002-332838 is used for a high-performance internal combustion engine in which the exhaust gas is likely to reach a high temperature as mentioned above.

SUMMARY OF THE INVENTION

In order to overcome the problems described above, preferred embodiments of the present invention provide an exhaust pipe for an internal combustion engine which can prevent discoloration and oxidation caused by high-temperature exhaust gas.

An exhaust pipe for an internal combustion engine according to a preferred embodiment of the present invention is an exhaust pipe for an internal combustion engine, the exhaust pipe including a metal tube enclosing a passage through which an exhaust gas from the internal combustion engine passes; and a ceramic film covering the metal tube from the outside, the ceramic film containing no more than about 0.5 mass % of a metallic element which is dominantly present in a surface of the metal tube, wherein, the ceramic film is an SiON film containing 30 mass % or less of O and 10 mass % or more of N.

In a preferred embodiment, the ceramic film preferably includes about 5 mass % or less of 0 and about 40 mass % or more of N.

In a preferred embodiment, the ceramic film is directly disposed on the surface of the metal tube.

In a preferred embodiment, the ceramic film has a thickness in a range of no less than about 5 nm and no more than about 300 nm.

In a preferred embodiment, the ceramic film has a thickness in a range of no less than about 5 nm and no more than about 30 nm.

In a preferred embodiment, the metal tube has a surface roughness Ra in a range of no less than about 0.4 μm and no more than about 3.2 μm.

In a preferred embodiment, the metal tube is composed of titanium, a titanium alloy, or stainless steel.

In a preferred embodiment, the metal tube includes a chrome plating layer formed on a surface thereof.

In a preferred embodiment, substantially no oxide film of the metallic element which is dominantly present in the surface of the metal tube is present between the metal tube and the ceramic film.

In a preferred embodiment, the ceramic film is a vapor-deposited film formed by a vapor deposition technique.

In a preferred embodiment, the ceramic film is a vapor-deposited film formed by a sputtering technique or an ion plating technique.

In a preferred embodiment, the metal tube has a surface roughness greater than a surface roughness range in which diffracted light for visible light is expected to occur, and the ceramic film has a thickness smaller than a thickness range in which interference fringes for visible light are expected to occur.

An internal combustion engine according to a preferred embodiment of the present invention includes an exhaust pipe for an internal combustion engine having the above-described unique construction.

A transportation apparatus according to a preferred embodiment of the present invention includes an internal combustion engine of the above-described unique construction.

The exhaust pipe for an internal combustion engine according to various preferred embodiments of the present invention features a ceramic film that contains no more than about 0.5 mass % (i.e., substantially none) of a metallic element which is dominantly present in the surface of the metal tube. Therefore, discoloration of the exhaust pipe and surface deterioration due to oxidation of such a metallic element at a high temperature are prevented. As a result, discoloration of the exhaust pipe caused by a high-temperature exhaust gas is prevented, whereby a good exterior appearance can be maintained. Furthermore, since this ceramic film is an SiON film containing about 30 mass % or less of 0 and about 10 mass % or more of N, there are provided high effects of preventing discoloration and deterioration of the exhaust pipe.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

The inventor has conducted an in-depth study of the reasons why high temperature oxidation and/or discoloration on the surface of an exhaust pipe cannot be sufficiently prevented with a silicon oxide film which has been formed through sol-gel processing. As a result of the study, it has been found that a silicon oxide film obtained through sol-gel processing contains a metallic element which is dominantly present in the exhaust pipe surface, and that oxidation of the metal at a high temperature causes discoloration or surface deterioration of the exhaust pipe.

Moreover, in a sol-gel processing, the organic compounds which were bound to silicon may undergo vaporization and decomposition during baking. Therefore, minute voids may occur in the resultant silicon oxide film, thus resulting in a low shielding ability against gas. Therefore, if the exhaust pipe is exposed to a high temperature, presumably, the metals at the exhaust pipe surface may diffuse into the silicon oxide film and be oxidized by being bound to external oxygen, or oxygen may permeate through the silicon oxide film to cause oxidation of the metals at the exhaust pipe surface. Thus, in the case where metals are contained in the silicon oxide film or minute voids have occurred in the silicon oxide film, the iron within the metals composing the exhaust pipe may form a reddish-brown oxide deposit on the surface, thus degrading the exterior appearance of the exhaust pipe.

A ceramic film of an exhaust pipe according to various preferred embodiments of the present invention is formed so that the percentage content of a metallic element which is dominantly present in the surface of the metal tube (i.e., the metallic element which substantially composes the surface of the metal tube) is no more than about 0.5 mass %. Thus, it can be said that the ceramic film contains substantially none of the dominant element of the metal tube surface. As a result, discoloration, oxidation, and deterioration of the surface of the metal tube are prevented, as will be described later.

Among such ceramic films, the inventor has conducted various studies by paying particular attention to silicon oxide nitride (SiON) films, thus finding that discoloration prevention effects can be greatly enhanced by prescribing the oxygen percentage content and nitrogen percentage content in the SiON film to be within specific ranges. Specifically, this unexpected effect is obtained by prescribing the oxygen percentage content and nitrogen percentage content in the SiON film to be 30 mass % or less and 10 mass % or more, respectively, as will be described later.

Furthermore, the inventor has found that vapor deposition techniques, such as sputtering technique and ion plating technique, are particularly suitable for forming a ceramic film (SiON film) which provides excellent discoloration prevention effects as described above. Conventionally, thin film formation utilizing a vapor deposition technique such as sputtering technique has been practiced for smaller-scale objects such as semiconductor devices, but has not been industrially practiced for larger-scale objects such as exhaust pipes due to difficulties in achieving a certain vacuum degree within the vapor deposition apparatus. Free from such common technological knowledge, the inventor has acquired the above-described knowledge through his own extensive research.

Hereinafter, various preferred embodiments of the present invention will be described with reference to the drawings.

Figure 1:
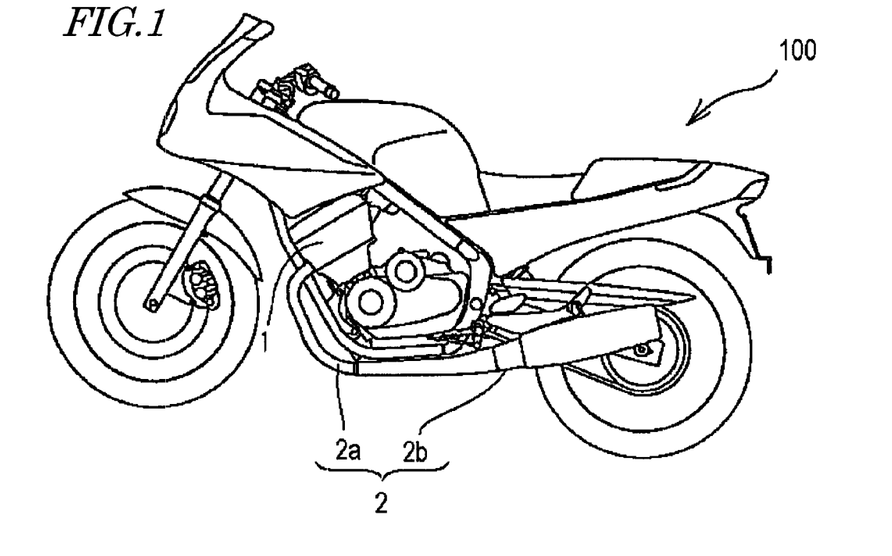
FIG. 1 is a side view showing a motorcycle in which an exhaust pipe for an internal combustion engine according to a preferred embodiment of the present invention is preferably used.

FIG. 1 shows a motorcycle 100 in which an exhaust pipe for an internal combustion engine according to a preferred embodiment of the present invention (which hereinafter may also be simply referred to as an "exhaust pipe") is used. The motorcycle 100 includes an internal combustion engine 1 and an exhaust pipe 2 which is connected to the internal combustion engine 1.

The exhaust pipe 2 is provided in order to allow the exhaust gas which is generated in the internal combustion engine 1 to be discharged at the rear of the body. The exhaust pipe 2 includes a bent portion 2a, which constitutes a substantially bent exhaust path for allowing the exhaust gas having been discharged at the front of the internal combustion engine 1 to be guided toward the rear, and a muffler 2b. The exhaust pipe 2 may be integrally formed of a single part, or composed of a plurality of parts which are connected or made integral with one another.

In the present preferred embodiment, the exhaust pipe 2 is preferably entirely exposed so as to appear on the exterior of the motorcycle 100, thus constituting a part of the overall design of the motorcycle 100. As will be specifically described below, the unique effects and advantages of preferred embodiments of the present invention, i.e., discoloration of the exhaust pipe 2 is prevented and the fresh exterior appearance of a brand-new motorcycle is retained for long periods of time, is more clearly enhanced in the case where the entire exhaust pipe 2 is exposed. However, as long as the exhaust pipe 2 at least partially appears on the exterior, another portion of the exhaust pipe 2 may be covered by a cowl or a protector, depending on the design of the motorcycle. Moreover, the shape of the motorcycle for which the exhaust pipe for an internal combustion engine according to preferred embodiments of the present invention is adopted is not limited to that shown in FIG. 1. For example, the exhaust pipe according to a preferred embodiment of the present invention may be adopted in a motorcycle having a structure as shown in FIG. 14.

Figure 2:
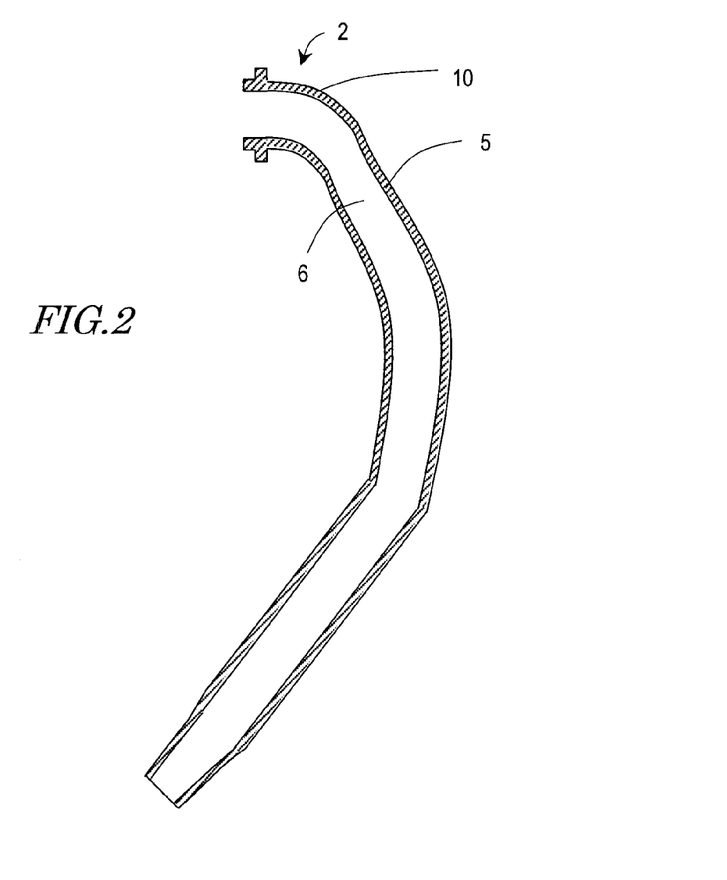
FIG. 2 is a cross-sectional view of an exhaust pipe for an internal combustion engine according to a preferred embodiment of the present invention.

FIG. 2 is a cross-sectional view showing a portion (portion 2a) of the exhaust pipe 2. The exhaust pipe 2 includes a metal tube 5 enclosing a passage 6 through which exhaust gas is allowed to pass, and a ceramic film 10 covering the metal tube 5 from the outside. Stated otherwise, exhaust gas flows inside the metal tube 5, and the ceramic film 10 is provided on the outside of the metal tube 5.

Note that the metal tube 5 only needs to enclose the passage 6. Therefore, a double tube structure may be adopted such that an inner tube which directly encloses the passage 6 is surrounded by an outer tube on the outside. However, the effects and advantages of the present invention will be more enhanced in the case of a single tube structure which directly encloses the passage 6, because, the temperature is likely to reach high levels on the outside of the metal tube 5. Moreover, the ceramic film 10 only needs to be provided in a region where prevention of oxidation is expected, so as to cover the metal tube 5 from the outside to prevent the metal tube 5 from being in contact with air (e.g., oxygen). Any other film or layer may be additionally formed between the metal tube 5 and the ceramic film 10, and a further film may cover the ceramic film 10 from the outside.

The metal tube 5 is preferably composed of carbon steel tubes for machine structural purposes (STKM), stainless steel (SUS), titanium, a titanium alloy, a nickel alloy, an aluminum alloy, or other suitable material. In order to enhance the metallic luster and decorativeness of the surface, the surface of the metal tube 5 may be chromium-plated to form a plating (e.g., a chrome plating) layer thereon. Since STKM does not have enough metallic luster for providing a high level of decorativeness, when a metal tube 5 composed of STKM is used, it is preferable that the surface of the metal tube 5 be chrome plated, or nickel-and-chrome plated. Moreover, in the case of using a metal tube 5 composed of SUS, its surface may have been subjected to electrolytic polishing.

The ceramic film 10 is preferably composed of an amorphous material which is dense in texture and is unlikely to be oxidized or decomposed even at a high temperature. Note that, as used in the present specification, the term "ceramic"

broadly means a solid material such as an oxide, nitride, or nitride-oxide of a metal or a nonmetal. The term "ceramic" encompasses not only those materials which are formed by a technique involving a baking step (as has traditionally been practiced), but also those materials which are formed by a vapor deposition technique, as will be specifically described below.

The ceramic film 10 according to the present preferred embodiment preferably contains no more than about 0.5 mass % of a metal which is dominantly (typically at a ratio of about 50% or more) present in the surface of the metal tube 5. If more than about 0.5 mass % of the dominant element of the surface of the metal tube 5 is contained in the ceramic film 10, this metallic element may be oxidized from the surface of the ceramic film 10 due to high temperature, possibly causing discoloration of the surface of the exhaust pipe 2. Moreover, it is also possible that the oxidation may progress from the oxidized metal into the interior of the metal tube 5. On the other hand, in the ceramic film 10 according to the present preferred embodiment, the percentage content of the dominant element of the surface of the metal tube 5 is preferably about 0.5 mass % or less, so that discoloration and oxidation due to high-temperature heat are prevented. When taking into consideration the exterior appearance of the exhaust pipe 2 in the case where the metal contained in the ceramic film 10 is oxidized, the percentage content of the dominant element of the surface of the metal tube 5 is preferably about 0.4 mass % or less, and more preferably about 0.3 mass % or less.

Note that the percentage content of the dominant element of the surface of the metal tube 5 may have local fluctuations within the ceramic film 10. However, it is still preferable that the percentage content is about 0.5 mass % or less at least in a central portion of the ceramic film 10 along the thickness direction. Moreover, it is preferable that the percentage content of the dominant element of the surface of the metal tube 5 is about 0.5 mass % or less in a portion excluding the area near the inner (i.e., closer to the metal tube 5) surface of the ceramic film 10 and the area near the outer surface. Assuming that the area near the inner surface and the area near the outer surface each account for about 10% of the overall thickness of the ceramic film 10, such a portion would correspond to about 80% of the entire ceramic film 10.

In order to ensure that the percentage content of the dominant element of the surface of the metal tube 5 is about 0.5 mass % or less, when forming the ceramic film 10 on the outside of the metal tube 5, a method is preferably used which does not allow the dominant element of the surface of the metal tube 5 to be diffused into the ceramic film 10. The inventor has found through various studies that, when using a vapor deposition technique for forming the ceramic film 10, the dominant element of the surface of the metal tube 5 is unlikely to be diffused into the ceramic film 10. It has also been found that a ceramic film which is formed by a vapor deposition technique is dense in texture, and therefore has a high gas shielding ability even at a temperature of about 500° C., thus preventing oxidation of the surface of the metal tube 5.

In the present specification, a "vapor deposition technique" refers to a CVD (chemical vapor deposition) technique and a PVD (physical vapor deposition) technique, both of which allow the matter to be deposited in a gaseous state. Among vapor deposition techniques, it is more preferable to use a physical vapor deposition technique. Since a film which is formed by an ion plating technique or a sputtering technique is generally dense in texture, it is particularly preferable that the ceramic film 10 is formed by an ion plating technique or a sputtering technique.

In the case of adopting a sputtering technique, it is possible to use a DC sputtering apparatus, an RF sputtering apparatus, a magnetron sputtering apparatus, an ion beam sputtering apparatus, or other suitable sputtering apparatus. In the case where any such method is used, plasma particles are allowed to collide against the surface of the metal tube 5 on which the ceramic film 10 is to be deposited, thus etching the surface of the metal tube 5. By utilizing this effect, the naturally-occurring oxide film (if any) on the surface of the metal tube 5 can be removed, thus improving the contact between the ceramic film 10 and the metal tube 5. In other words, it is preferable that no oxide film of the metallic element which is dominantly present in the surface of the metal tube 5 is substantially formed between the ceramic film 10 and the metal tube 5. Even in the case of forming the ceramic film 10 by a deposition method which does not utilize plasma, it would be preferable to remove any naturally-occurring oxide film on the surface of the metal tube 5 by a physical or chemical method, prior to forming the ceramic film 10.

A ceramic film 10 which is formed by a vapor deposition technique is basically an amorphous film, and will remain amorphous even when heated to a high temperature during engine operation. As used herein, an "amorphous film" is a film which lacks any long-periodic structure that can be observed as diffraction peaks by an X-ray diffraction technique. Depending on the formation conditions, the resultant film may be partly crystallized when heated, but this will not present any practical problems in terms of gas shielding ability.

Specifically, the ceramic film 10 according to the present preferred embodiment is preferably a silicon oxide nitride (SiON) film containing no more than about 30 mass % of oxygen (O) and no less than about 10 mass % of nitrogen (N). The inventor has paid particular attention to SiON films among other ceramic films, and studied their characteristics from various standpoints. As a result, the inventor has found that the discoloration prevention effect of an SiON film is drastically improved by prescribing the percentage contents of oxygen and nitrogen in the SiON film to be within the aforementioned ranges, thus arriving at various preferred embodiments of the present invention. The study results of the relationship between the percentage contents of oxygen and nitrogen and the discoloration prevention effect will be specifically described below. Before that, a production method for the exhaust pipe 2 will be described first. Hereinafter, an example of forming the ceramic film 10 by a sputtering technique will be described.

First, a metal tube 5 is prepared. In the case where STKM is used as a material of the metal tube 5, it is preferable to perform chromium plating on the surface of the metal tube 5 in order to improve metallic luster and decorativeness.

Figure 3A:
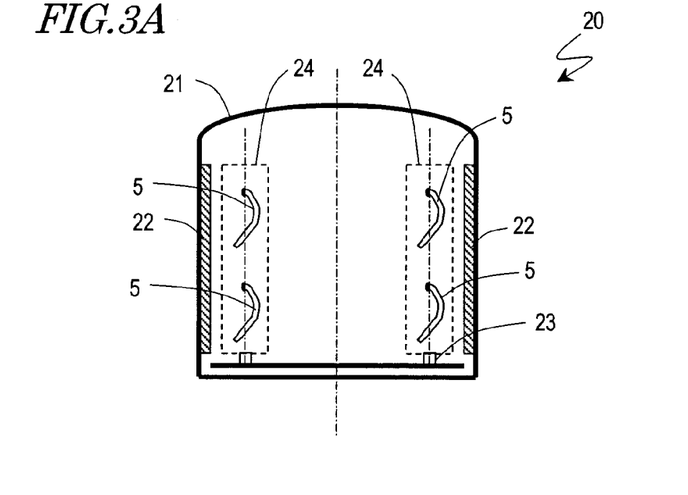
FIGS. 3A and 3B are a side cross-sectional view and an upper cross-sectional view, respectively, schematically showing the structure of a sputtering apparatus used for the production of the exhaust pipe for an internal combustion engine according to a preferred embodiment of the present invention.
Figure 3B:
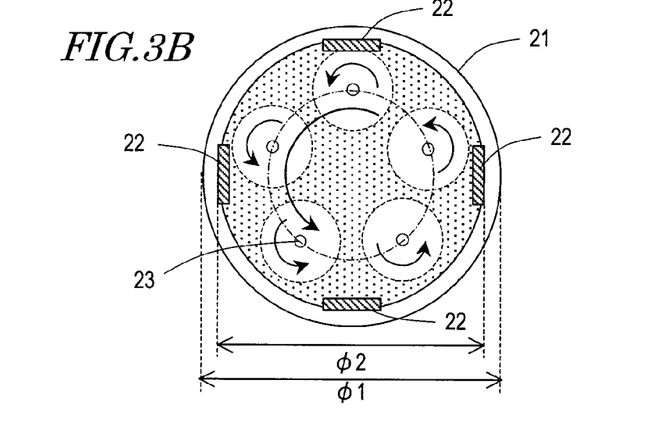

Next, as shown in FIGS. 3A and 3B, the metal tube 5 is introduced into a chamber 21 of a sputtering apparatus 20. The sputtering apparatus 20 illustrated in FIGS. 3A and 3B includes a plurality of holders 24, each capable of retaining and suspending two metal tubes 5 on top of one another, thus making it possible to form ceramic films 10 on a multitude of metal tubes 5 simultaneously. Each holder 24 orbits within the chamber 21 while rotating around a pivot axis 23. A plurality of targets 22 are provided outside of the orbit along which the holders 24 revolve. In the present preferred embodiment, where a silicon oxide nitride film is to be formed as the ceramic film 10, silicon (or silicon nitride) targets 22 are preferably used. The chamber 21 preferably has an inner diameter φ1 of, for example, about 1200 mm. An effective region (i.e., a region in which actual film formation takes place) may be a cylindrical space defined by a diameter φ2 of about 1080 mm and a height of about 1800 mm, for example. By using the sputtering apparatus 20 having such a structure, it becomes possible to form the ceramic film 10 with a uniform thickness, entirely around the outside of each metal tube 5 which has a three-dimensional shape. It also becomes possible to process many metal tubes 5 in a single batch.

The metal tube 5 is placed in each holder 24, and then the chamber 21 is evacuated by using a pump (not shown). Once the inside of the chamber 21 reaches a predetermined degree of vacuum, argon is introduced into the chamber 21, and then an electric discharge is begun. While allowing the holders 24 to rotate and orbit, a bias voltage is applied in such a manner that the plasma particles generated by the electric discharge collide with each metal tube 5, and the surface of each metal tube 5 is etched by reverse sputtering. The reverse sputtering is preferably conducted until the naturally-occurring oxide film present on the surface of the metal tube 5 is completely removed. Such a naturally-occurring oxide film generally has a thickness in the range from about 2 nm to about 3 nm. By removing the naturally-occurring oxide film, the contact between the metal tube 5 and the ceramic film 10 can be strengthened.

After removing the naturally-occurring oxide film, nitrogen gas and oxygen gas are introduced into the chamber 21, and an electric discharge is begun. A bias voltage is applied in such a manner that the plasma particles will collide against the targets, whereby the deposition of the ceramic film 10 is begun. In the present preferred embodiment, silicon particles which have emitted from the targets react with nitrogen plasma and oxygen plasma, and are deposited on the surface of the metal tube 5 in the form of a silicon oxide nitride film. The deposition time is to be determined in accordance with the intended film thickness of the ceramic film to be formed, while paying attention to conditions such as the number of targets and the pressure and bias voltage during reaction. Sputtering is performed for a predetermined amount of time to form the ceramic film 10 so as to have a predetermined thickness on the outside of the metal tube 5, whereby the exhaust pipe 2 is obtained.

The ceramic film 10 which has been thus formed contains no more than about 0.5 mass % of a metallic element which is dominantly present in the surface of the metal tube 5. It can be said that the ceramic film 10 contains substantially none of the dominant metal of the surface of the metal tube 5. Therefore, discoloration of the exhaust pipe 5 and surface deterioration caused by oxidation of such a metallic element at a high temperature are prevented. As a result, discoloration of the exhaust pipe 5 caused by a high-temperature exhaust gas is prevented, whereby a good exterior appearance can be maintained. The ceramic film 10 having been formed by a vapor deposition technique is dense in texture, and therefore has a good shielding ability. Thus, external oxygen is prevented from reaching the metal tube 5, and the iron which is contained in the metal tube 5 is effectively prevented from oxidizing to deposit on the surface.

The thickness of the ceramic film 10 is preferably no less than about 5 nm and no more than about 300 nm. If the ceramic film 10 is thinner than about 5 nm, it becomes difficult to obtain a sufficient gas shielding ability and therefore complete prevention of oxidation and discoloration of the surface of the metal tube 5 becomes difficult. It also becomes difficult to form a ceramic film 10 that uniformly covers the metal tube 5. On the other hand, if the ceramic film 10 is thicker than about 300 nm, the amount of time required for forming the ceramic film 10 increases to decrease producibility, which is not preferable. Moreover, if the ceramic film 10 is thicker than about 300 nm or if the ceramic film 10 does not have a completely uniform thickness, interference colors such as iridescent colors are likely to be observed, thus detracting from the decorativeness of the exterior appearance. From the standpoint of producibility of the ceramic film 10, the thickness of the ceramic film 10 is preferably about 50 nm or less, and more preferably about 40 nm or less. If the thickness of the ceramic film 10 is in the range from about 5 nm to about 30 nm, a ceramic film 10 which is free of interference colors and is colorless and transparent can be obtained regardless of the material and the magnitude of the refractive index.

Figure 4:
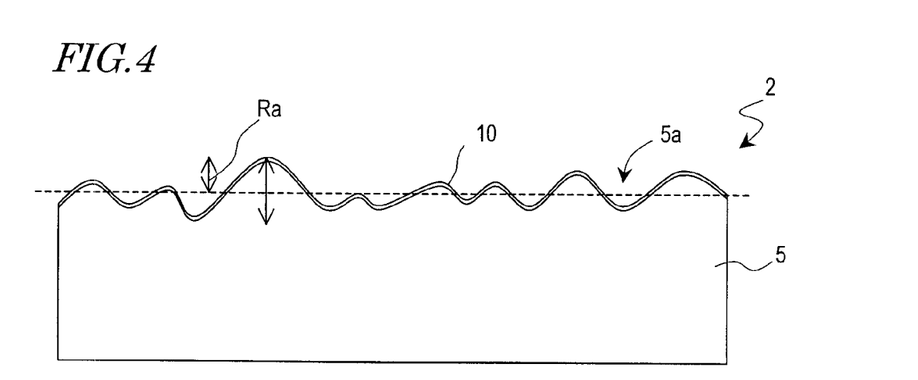
FIG. 4 is a schematic structural illustration around the surface of the exhaust pipe for an internal combustion engine according to a preferred embodiment of the present invention.

As shown in FIG. 4, the surface of the metal tube 5 preferably has a large surface roughness relative to the thickness of the ceramic film 10. Specifically, the surface of the metal tube 5 preferably has an average roughness Ra of about 0.4 μm or more. If the average roughness is smaller than about 0.4 μm, when visible light is reflected from the surface of the metal tube 5, mutual intensification may occur if the optical path difference between wave fronts reflected from adjoining grooves is equal to an integer multiple of the wavelength, thus causing diffracted light. If this happens, the aesthetic exterior appearance of the exhaust pipe 2 may be degraded. Moreover, if the average roughness is so small that the surface of the metal tube 5 is smooth, the ceramic film 10 may have poor contact with the surface of the metal tube 5. There is no upper limit to the value of the average roughness Ra of the surface of the metal tube 5. However, if the average roughness Ra of the surface of the metal tube 5 is about 3.2 μm or more, marketability and aesthetics may be undesirably affected due to low light reflectance.

Thus, on the surface of a metal tube having a surface roughness that is greater than a range of surface roughness in which diffracted light for visible light is expected to occur, a ceramic film is formed and has a thickness that is smaller than a range of thickness in which interference fringes for visible light are expected to occur. As a result, there is obtained an exhaust pipe having uniform metallic luster such that, even if a high-temperature exhaust gas passes therethrough, surface oxidation or discoloration does not occur and good contact is obtained while avoiding interference fringes.

ANALYSIS AND EXPERIMENTAL EXAMPLES

Firstly, with respect to exhaust pipes according to preferred embodiments of the present invention and an exhaust pipe as disclosed in Japanese Laid-Open Patent Publication No. 2002-332838, supra, distribution of elements along a depth direction was examined. As an example of the exhaust pipe according to a preferred embodiment of the present invention (FIGS. 5A and 5B), a metal tube composed of SUS304 was prepared, and on this metal tube, a silicon oxide nitride film (as a ceramic film) was formed by using a sputtering technique. The formation of the silicon oxide nitride film was performed as follows. The metal tube (which had been subjected to chrome plating) was placed in a chamber of a magnetron sputtering apparatus, and the chamber was evacuated until reaching a vacuum degree of about $3 \times 10^{-3}$ Pa. Thereafter, argon was introduced into the chamber at a flow rate of about 100 sccm. While maintaining a pressure of about $3 \times 10^{-1}$ Pa, a reverse sputtering was performed for approximately 10 minutes by supplying power at 800 V and 5 A (4 KW), thus removing the naturally-occurring oxide film on the metal tube surface. Thereafter, nitrogen and oxygen were introduced into the chamber, and by using a silicon target, a sputtering was performed for approximately 5 minutes by supplying power at 800 V and 5 A (4 KW) while maintaining a pressure of about $3 \times 10^{-1}$ Pa, thus forming a silicon oxide nitride film having a thickness of about 50 nm on the metal tube surface.

As a conventional example (FIGS. 6A and 6B), a metal tube composed of STKM, whose surface had been subjected to nickel plating (under coating) and chromium plating (top coating), was prepared, and a silicon oxide film (as a ceramic film) was formed thereon through sol-gel processing. With respect to the exhaust pipes according to a preferred embodiment of the present invention and the conventional exhaust pipe thus obtained, distribution of elements along the depth direction was measured by using a GDS (glow discharge spectroscopy) technique.

Figure 5A:
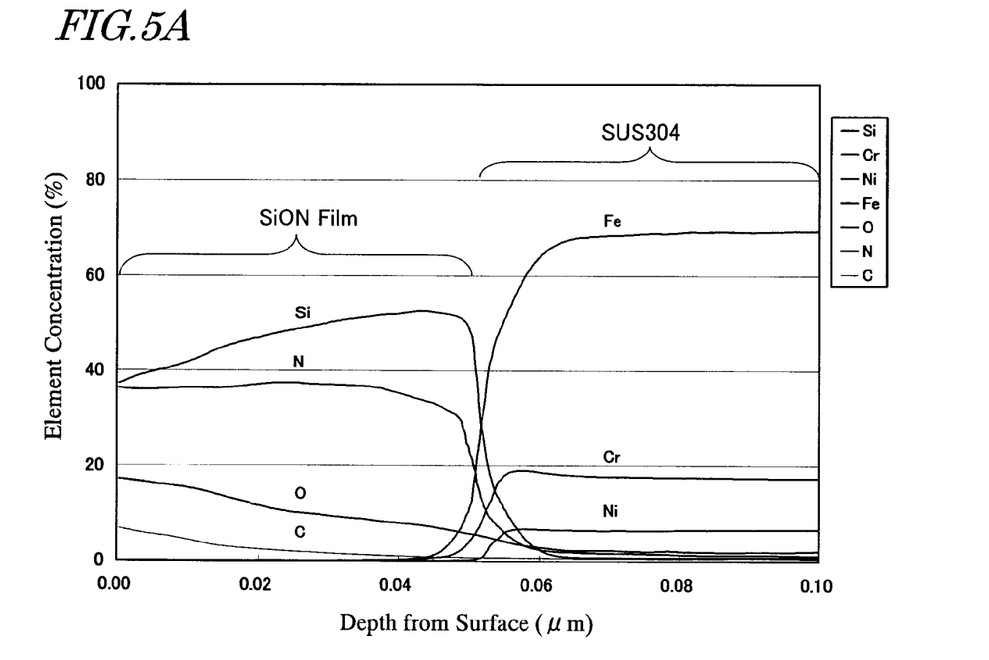
FIGS. 5A and 5B are graphs each showing element distributions along the depth direction of an exhaust pipe for an internal combustion engine according to a preferred embodiment of the present invention, where the distribution is obtained through a GDS analysis.
Figure 5B:
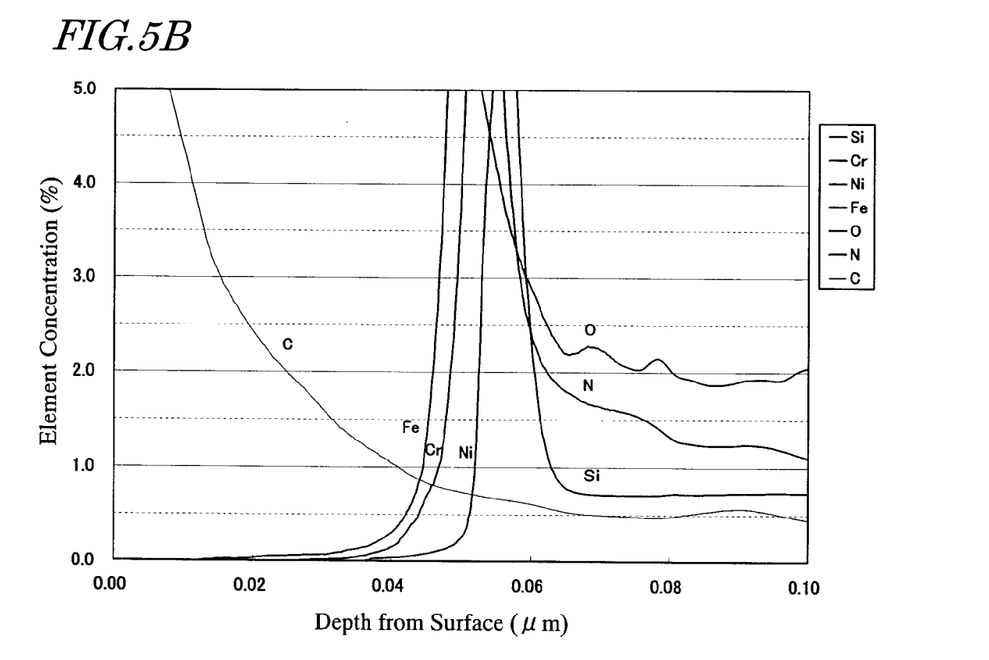

FIG. 5A shows element distributions along the depth direction of an exhaust pipe according to a preferred embodiment of the present invention. FIG. 5B is an enlarged diagram showing element distributions in the area near the surface in FIG. 5A. As is clear from these figures, in accordance with the exhaust pipe according to a preferred embodiment of the present invention, iron, which is a dominant element of the surface of the metal tube, is hardly contained in the silicon oxide nitride film (ceramic film). Specifically, the element concentration of iron in the silicon oxide nitride film begins at about 0.5% or less as shown in FIG. 5B, and rapidly increases at the boundary between the silicon oxide nitride film and the metal tube.

Figure 6A:
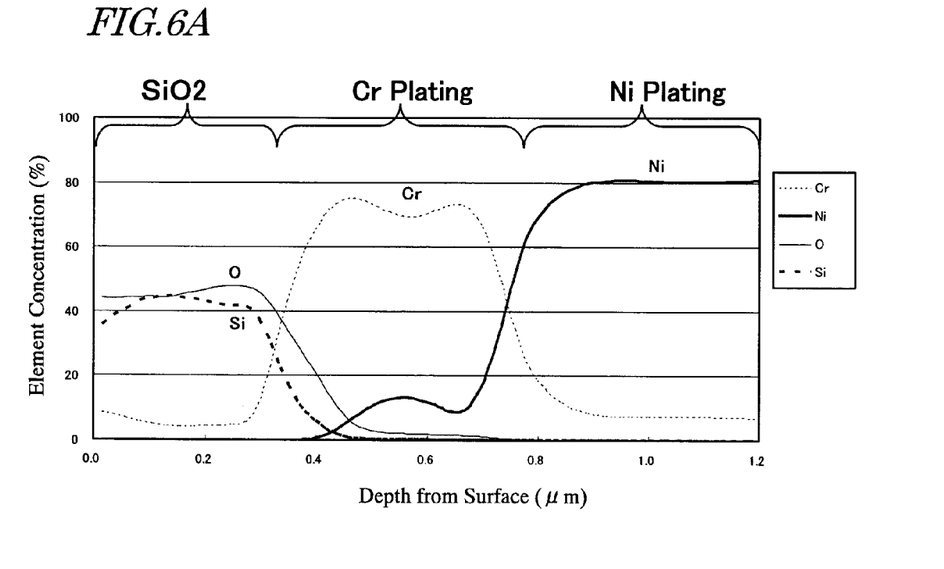
FIGS. 6A and 6B are graphs each showing element distributions along the depth direction of a conventional exhaust pipe for an internal combustion engine, where the distribution is obtained through a GDS analysis.
Figure 6B:
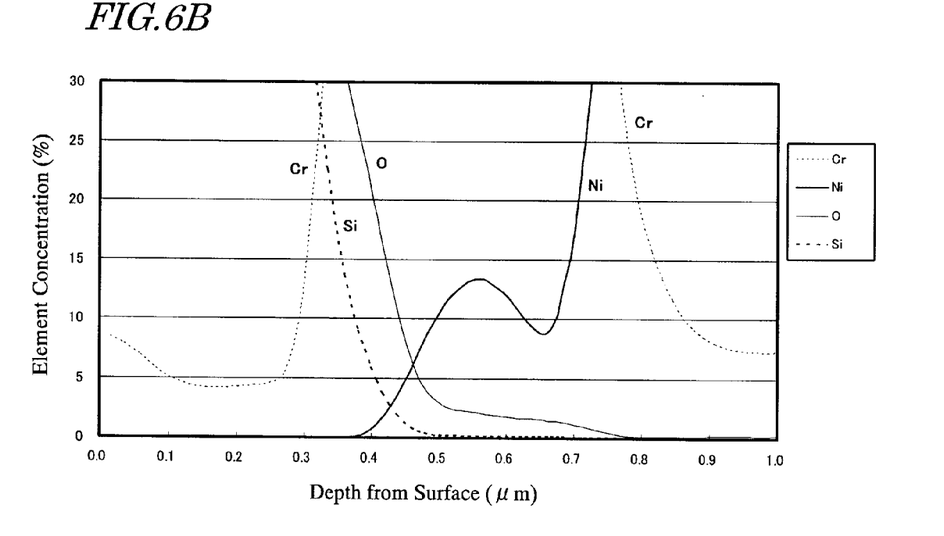

FIG. 6A shows element distributions along the depth direction of the conventional exhaust pipe. FIG. 6B is an enlarged diagram showing element distributions in the area near the surface in FIG. 6A. As is clear from these figures, in the conventional exhaust pipe, chromium, which is a dominant element of the surface of the metal tube, is contained in a relatively large amount in the silicon oxide film, which has been formed through sol-gel processing. Specifically, the element concentration of chromium in the silicon oxide film is about 4 mass %. At the boundary between the silicon oxide film and the chrome plating, chromium concentration increases rather slowly. The profile of oxygen concentration shows that, as compared to silicon, oxygen penetrates deep into the interior of the exhaust pipe and with a high rate. This presumably indicates that chromium has diffused into the silicon oxide film which has been formed through sol-gel processing, and oxygen which is bound to chromium (i.e., chromium oxide) is present at the boundary between the silicon oxide film and the chrome plating.

Figure 7:
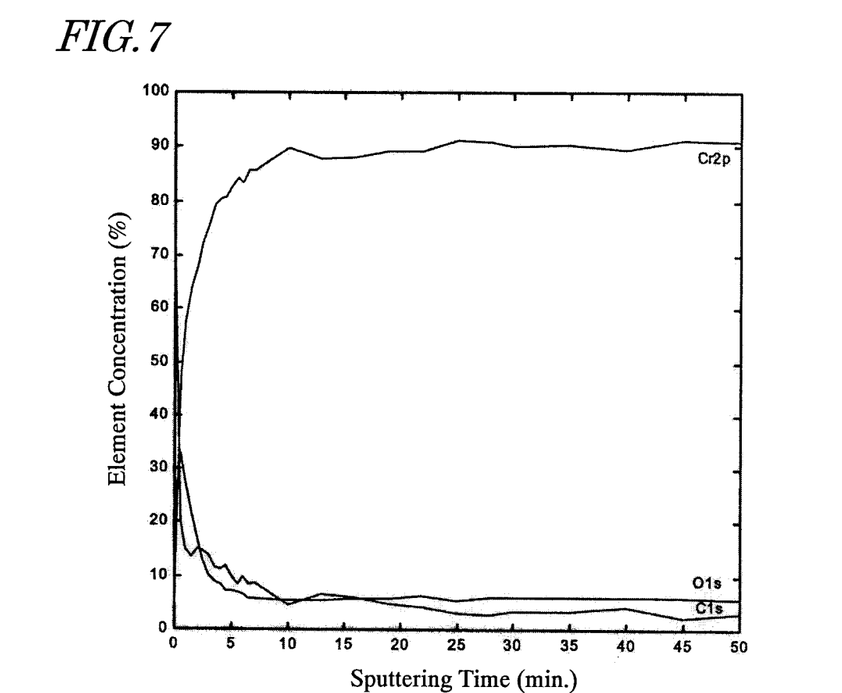
FIG. 7 is a graph showing element distributions along the depth direction of a chrome plating film, where the distribution is obtained through an XPS analysis.

In order to examine the state of the boundary between the silicon oxide film and the chrome plating in the conventional exhaust pipe, element concentration profiles along the depth direction of the conventional exhaust pipe were further measured by an XPS technique (X-ray photoelectron spectroscopy). First, in order to examine the thickness of the naturally-occurring oxide film on the chrome plating, a chrome-plated sample was produced, and the element concentrations along the depth direction thereof were examined by an XPS technique. As shown in FIG. 7, the naturally-occurring chromium oxide film had a thickness which would be equivalent to about 5 minutes of sputtering time.

Figure 8A:
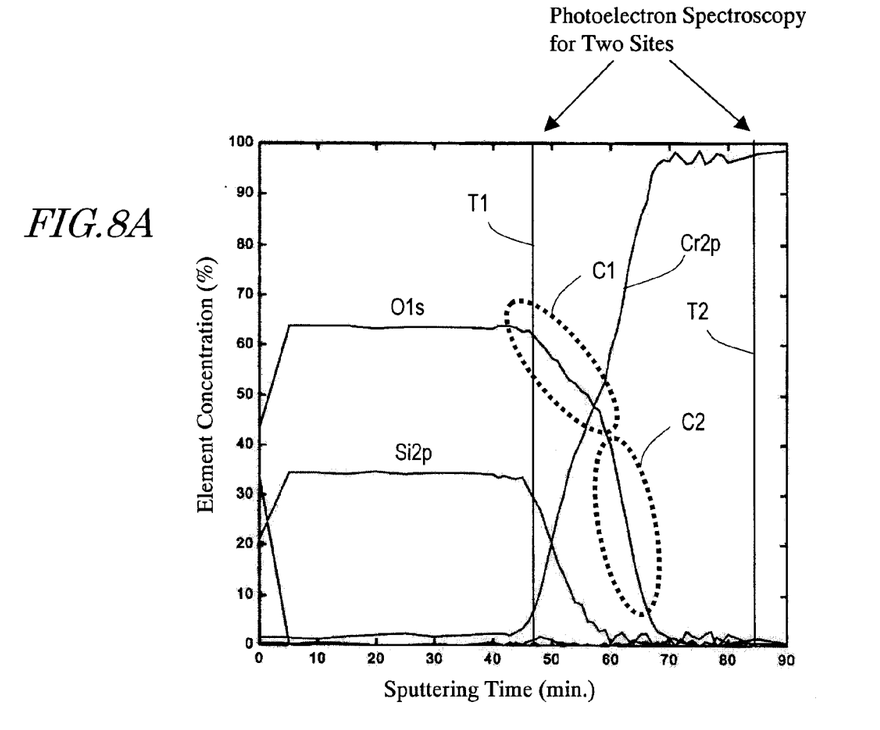
FIGS. 8A and 8B are a graph showing element distributions along the depth direction of a conventional exhaust pipe for an internal combustion engine, where the distribution is obtained through an XPS analysis, and a graph showing the binding energy of chromium taken at two points shown in FIG. 8A.

FIG. 8A shows element distributions along the depth direction of the conventional exhaust pipe as measured by an XPS technique. As is clear from the figure, the oxygen (O1s) concentration, which remains constant within the silicon oxide film, decreases in two steps at the interface with the chrome plating, as shown encircled by broken lines C1 and C2. The decrease (C2) closer to the interface with the chrome plating would be equivalent to about 5 minutes of sputtering time, and therefore is considered to represent the oxygen contained in the naturally-occurring chromium oxide film.

Figure 8B:
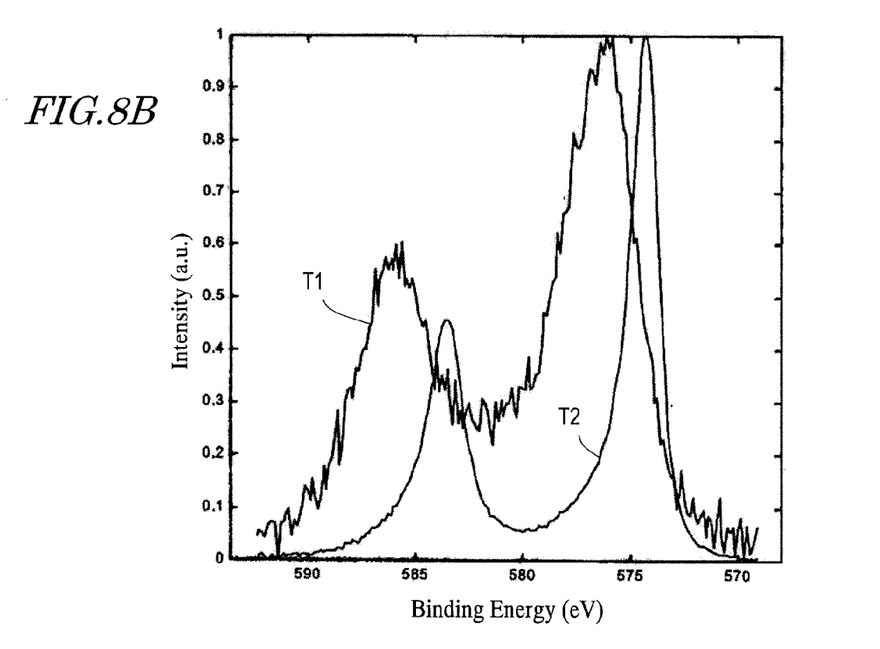

On the other hand, in order to examine the state of chromium in a region where the decrease C1 in oxygen concentration is occurring, the binding energy of 2 p valence electrons of chromium at sputtering times T1 and T2 were measured. The measurement results are shown in FIG. 8B. At sputtering time T2, elements other than chromium are substantially absent, and it is therefore presumable that only chromium exists at the depth indicated by sputtering time T2. Therefore, the profile T2 in FIG. 8B represents the binding energy between chromium atoms (metallic bond). On the other hand, the profile T1 is shifted toward the higher energy side, thus indicating chromium in an oxidized state. This chromium oxide is considered to have been generated when forming the silicon oxide film through sol-gel processing.

Thus, it has been shown that, as compared to the conventional exhaust pipe, the exhaust pipe 2 according to a preferred embodiment of the present invention is characterized in that a metallic element which is dominantly present in the surface of the metal tube 5 is substantially absent (i.e., about 0.5 mass % or less) from the ceramic film 10.

Figure 9:
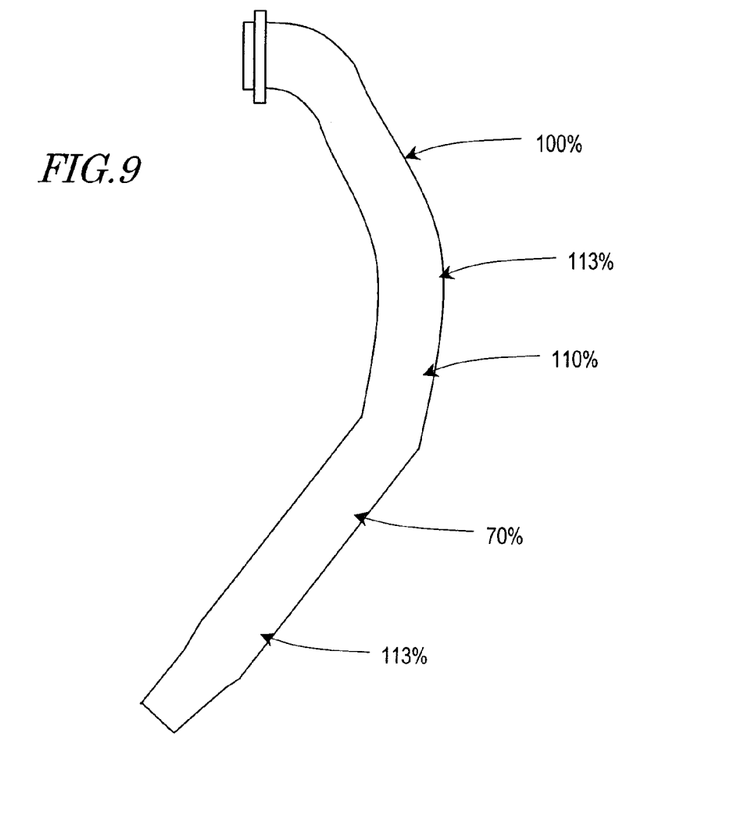
FIG. 9 is a diagram for explaining a ceramic film distribution in the exhaust pipe for an internal combustion engine according to a preferred embodiment of the present invention.

FIG. 9 is a schematic diagram showing an exemplary film thickness distribution in an exhaust pipe which is formed by the above-described method. A percentage value at each arrowhead in FIG. 9 represents a ratio of an actually-obtained thickness to a target value. As is clear from the figure, it is possible to form the ceramic film 10 within fluctuations of about ±30% even if the exhaust pipe has a complicatedly bent three-dimensional shape. Thus, it can be seen that a physical vapor deposition technique is able to form a uniform ceramic film 10.

The above-described conventional example is directed to a silicon oxide film which has been formed through sol-gel processing. Note, however, that any metal oxide film formed by a technique which has conventionally been used for coating an exhaust pipe (e.g., a technique of applying a solution containing a metal compound onto an exhaust pipe surface via application or immersion, followed by a baking) would also show poor denseness as does a silicon oxide film formed through sol-gel processing. For example, in the case where the metal compound solution contains an organic compound, vaporization and decomposition of the organic compound bound to a metal will occur during baking, thus allowing minute voids to be formed and rendering the film porous. Moreover, since such a technique oxidizes (through baking) a metal that is contained in a film which has once been formed, the film denseness is decreased through oxidation, and oxidation will continue to progress during subsequent use.

Next, in order to study the relationship between the nitrogen and oxygen percentage contents in a silicon oxide nitride film (SiON film) and its discoloration prevention effects, SiON films were formed on the surface of the metal tube 5 under various conditions, and subjected to a high-temperature heating test. The nitrogen percentage content and oxygen percentage content in the SiON film were varied by adjusting the flow rate ratio between nitrogen gas and oxygen gas introduced into the chamber 21 of the sputtering apparatus 20. A metal tube 5 which was composed of SUS304 was used. The high-temperature heating test was performed by leaving the exhaust pipe 2 in the atmosphere at 500° C. for 24 hours, and examining the discoloration of the surface of the exhaust pipe 2. The results are shown in Table 1 below.

Figure 10:
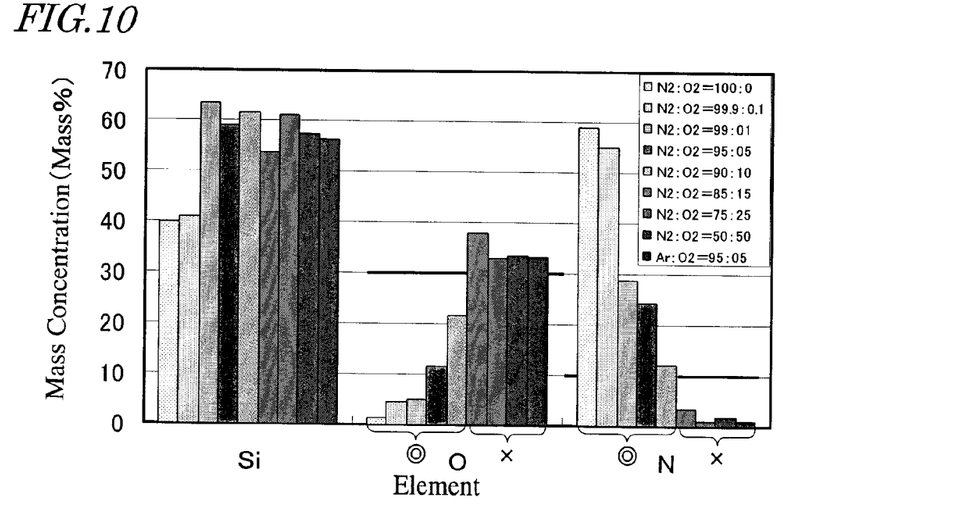
FIG. 10 is a graph showing a relationship between a flow rate ratio of a gas which is introduced into a chamber and the chemical composition of an SiON film.

As for heating evaluations, a color difference $\Delta E^*$ in $L^*a^*b^*$ color system was measured, four degrees of discoloration were evaluated: the color difference $\Delta E^*$ before and after heating was 1 or less (⊚); more than 1 but 2 or less (○); more than 2 but 3 or less (Δ); and more than 3 (x). Table 1 also shows the chemical composition of each resultant SiON film. The relationship between the chemical composition and the gas flow rate ratio is shown in FIG. 10. As shown in FIG. 10, as the proportion of nitrogen gas increases, the nitrogen percentage content in the SiON film increases and the oxygen percentage content decreases.

TABLE 1

| Gas Flow Rate Ratio | Chemical Composition of Film (Mass %) | | | | | Evaluation Results | |
|---|---|---|---|---|---|---|---|
| | Si | O | N | others | total | Heating Evaluation | Color Difference $\Delta E^*$ |
| $N_2:O_2 = 100:0$ | 39.8 | 1.2 | 59.0 | 0 | 100.0 | ◉ | 0.29 |
| $N_2:O_2 = 99.9:0.1$ | 40.7 | 4.4 | 54.9 | 0 | 100.0 | ◉ | 0.75 |
| $N_2:O_2 = 99:1$ | 63.3 | 5.0 | 28.7 | 3.0 | 100.0 | ◉ | 0.89 |
| $N_2:O_2 = 95:5$ | 58.9 | 11.7 | 24.3 | 5.1 | 100.0 | ◉ | 0.90 |
| $N_2:O_2 = 90:10$ | 61.5 | 21.5 | 12.0 | 5.0 | 100.0 | ◉ | 0.97 |
| $N_2:O_2 = 85:15$ | 53.7 | 38.0 | 3.4 | 4.9 | 100.0 | X | 15.4 |
| $N_2:O_2 = 75:25$ | 61.0 | 33.0 | 1.0 | 5.0 | 100.0 | X | 17.3 |
| $N_2:O_2 = 50:50$ | 57.3 | 33.3 | 1.8 | 7.6 | 100.0 | X | 16.7 |
| $N_2:O_2 = 95:05$ | 56.3 | 33.2 | 1.0 | 9.5 | 100.0 | X | 19.2 |

It can be seen from Table 1 that, as the proportion of nitrogen gas increases, i.e., as the nitrogen percentage content increases and the oxygen percentage content decreases in the silicon oxide nitride film, there is less surface oxidation and discoloration at high temperatures, so that a good exterior appearance is maintained. Specifically, as can be seen from Table 1 and FIG. 10, a very good oxidation prevention effect can be obtained and discoloration and deterioration of the surface of the exhaust pipe 2 are prevented when the nitrogen percentage content is 10 mass % or more and the oxygen percentage content is 30 mass % or less.

Figure 11:
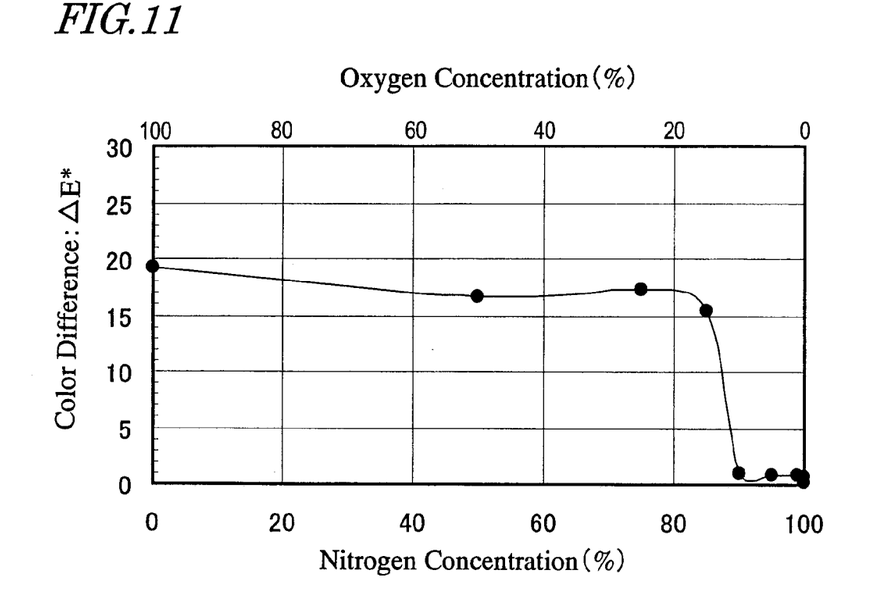
FIG. 11 is a graph showing a relationship between nitrogen gas concentration, oxygen gas concentration, and color difference ΔE*.

Now, when one pays attention to the color difference $\Delta E^*$ in Table 1, it can be seen that the color difference $\Delta E^*$ drastically increases once the nitrogen and oxygen percentage contents fall outside the aforementioned ranges. FIG. 11 shows the relationship between the nitrogen gas and oxygen gas concentrations and the color difference $\Delta E^*$. As shown in FIG. 11, $\Delta E^*$ drastically increases once the nitrogen gas concentration becomes smaller than a certain value (i.e., the oxygen gas concentration becomes greater than a certain value). This indicates that the characteristics of the silicon oxide nitride film undergo critical changes, such that the discoloration and oxidation preventing effects are greatly improved by prescribing the nitrogen percentage content and oxygen percentage contents to be within the aforementioned ranges.

Figure 12:
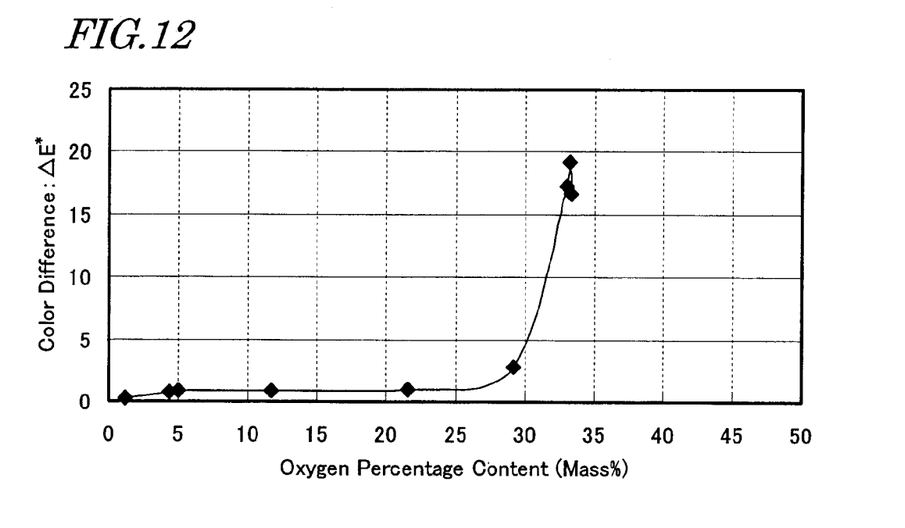
FIG. 12 is a graph showing a relationship between an oxygen percentage content of an SiON film and color difference ΔE*.
Figure 13:
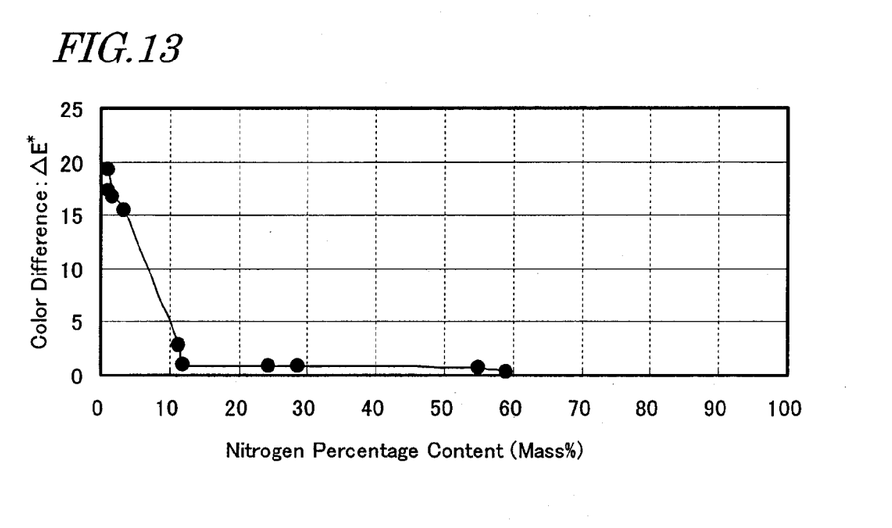
FIG. 13 is a graph showing a relationship between a nitrogen percentage content of an SiON film and color difference ΔE*.

FIG. 12 shows the relationship between the oxygen percentage content in the SiON film and the color difference $\Delta E^*$ FIG. 13 shows the relationship between the nitrogen percentage content in the SiON film and the color difference $\Delta E^*$. It can be seen from FIGS. 12 and 13 that the color difference $\Delta E^*$ before and after heating can be sufficiently reduced by prescribing the oxygen percentage content and nitrogen percentage content in the SiON film to be about 30 mass % or less and about 10 mass % or more, respectively, whereby a good oxidation prevention effect is obtained.

The reason for such unexpected effects is not known to the inventor. However, during heating to a high temperature, a phenomenon occurs where the silicon in the silicon oxide nitride film binds to external oxygen and instead releases toward the metal tube the oxygen to which the silicon has originally been bound. It is presumable that this phenomenon becomes less likely to occur as the oxygen percentage content becomes lower, i.e., as the nitrogen percentage content becomes higher.

From the standpoint of enhancing the discoloration prevention effect, it is preferable to decrease the oxygen percentage content and increase the nitrogen percentage content in the SiON film as much as possible. More preferably, the oxygen percentage content is 5 mass % or less and the nitrogen percentage content is 40 mass % or more.

However, in order to sufficiently reduce the oxygen percentage content in the SiON film, it will be necessary to evacuate the interior of the chamber 21 so as to attain a sufficiently high vacuum degree, and then introduce substantially nothing but the nitrogen gas into the chamber 21 before performing sputtering. For example, in order to attain an oxygen percentage content of 5 mass % or less, it is necessary to prescribe the vacuum degree in the chamber 21 to about $1 \times 10^{-4}$ Pa or less. Prescribing the vacuum degree in a chamber 21 which is large enough to accommodate a part as large as the exhaust pipe 5 to the aforementioned high value may require an increased amount of time for production, which would be disadvantageous for production. Even if long hours of evacuation are performed by using a high-performance pump, it will still be impossible for the amount of residual oxygen and the amount of oxygen that oozes out of the workpiece, jigs, apparatus, etc., to become zero. Therefore, in actual production, it is very difficult to achieve an oxygen percentage content of less than about 1 mass %.

On the other hand, in order to ensure that the oxygen percentage content is more than about 5 mass % but about 30 mass % or less and that the nitrogen percentage content is about 10 mass % or more but less than about 40 mass %, the vacuum degree in the chamber 21 only needs to be about $1 \times 10^{-3}$ Pa. Therefore, prescribing such ranges for the percentage contents of oxygen and nitrogen will reduce the amount of time required for production, which is very advantageous for production. Note that, even if the percentage contents of oxygen and nitrogen are prescribed to be within such ranges, as shown in Table 1, the color difference $\Delta E^*$ can be made sufficiently small (e.g., 1 or less) and an adequate oxidation prevention effect is obtained because, as described above, preferred embodiments of the present invention exploit the unique characteristics of an SiON film, i.e., its oxidation prevention effect is drastically improved by ensuring that the percentage contents of oxygen and nitrogen in the film fall within specific ranges.

According to the present invention, an exhaust pipe for an internal combustion engine is provided which can reliably prevent discoloration and oxidation due to a high-temperature exhaust gas.

The exhaust pipe for an internal combustion engine according to various preferred embodiments of the present invention can be used in a wide variety of applications, including a vehicle having an internal combustion engine (e.g., a motorcycle or an all-terrain four-wheel vehicle) and a transportation apparatus having an internal combustion engine (e.g., a ship or an airplane).

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2005-258035 filed on Sep. 6, 2005, the entire contents of which are hereby incorporated by reference.

What is claimed is:

1. An exhaust pipe for an internal combustion engine, the exhaust pipe comprising:
  a metal tube enclosing a passage through which an exhaust gas from the internal combustion engine passes; and
  a ceramic film covering the metal tube from outside thereof, the ceramic film containing no more than about 0.5 mass % of a metallic element which is dominantly present in a surface of the metal tube; wherein,
  the ceramic film is a silicon oxide nitride film containing about 30 mass % or less of oxygen and about 10 mass % or more of nitrogen.

2. The exhaust pipe of claim 1, wherein the ceramic film contains about 5 mass % or less of oxygen and about 40 mass % or more of nitrogen.

3. The exhaust pipe of claim 1, wherein the ceramic film is directly disposed on the surface of the metal tube.

4. The exhaust pipe of claim 1, wherein the ceramic film has a thickness in a range of no less than about 5 nm and no more than about 300 nm.

5. The exhaust pipe of claim 1, wherein the ceramic film has a thickness in a range of no less than about 5 nm and no more than about 30 nm.

6. The exhaust pipe of claim 4, wherein the metal tube has a surface roughness Ra in a range of no less than about 0.4 µm and no more than about 3.2 µm.

7. The exhaust pipe of claim 1, wherein the metal tube is composed of titanium, a titanium alloy, or stainless steel.

8. The exhaust pipe of claim 1, wherein the metal tube includes a chrome plating layer located on a surface thereof.

9. The exhaust pipe of claim 1, wherein substantially no oxide film of the metallic element which is dominantly present in the surface of the metal tube is present between the metal tube and the ceramic film.

10. The exhaust pipe of claim 1, wherein the ceramic film is a vapor-deposited film formed by a vapor deposition technique.

11. The exhaust pipe of claim 10, wherein the ceramic film is a vapor-deposited film formed by a sputtering technique or an ion plating technique.

12. The exhaust pipe of claim 1, wherein the metal tube has a surface roughness greater than a surface roughness range in which diffracted light for visible light is expected to occur, and the ceramic film has a thickness smaller than a thickness range in which interference fringes for visible light are expected to occur.

13. An internal combustion engine comprising:
  an exhaust pipe including:
    a metal tube enclosing a passage through which an exhaust gas from the internal combustion engine passes; and
    a ceramic film covering the metal tube from outside thereof, the ceramic film containing no more than about 0.5 mass % of a metallic element which is dominantly present in a surface of the metal tube; wherein
    the ceramic film is a silicon oxide nitride film containing about 30 mass % or less of oxygen and about 10 mass % or more of nitrogen.

14. A transportation apparatus comprising:
  an internal combustion engine; and
  an exhaust pipe connected to the internal combustion engine, the exhaust pipe including:
    a metal tube enclosing a passage through which an exhaust gas from the internal combustion engine passes; and
    a ceramic film covering the metal tube from outside thereof, the ceramic film containing no more than about 0.5 mass % of a metallic element which is dominantly present in a surface of the metal tube; wherein
    the ceramic film is a silicon oxide nitride film containing about 30 mass % or less of oxygen and about 10 mass % or more of nitrogen.

15. An exhaust pipe for an internal combustion engine, the exhaust pipe comprising:
  a metal tube enclosing a passage through which an exhaust gas from the internal combustion engine passes; and
  a ceramic film covering the metal tube from outside thereof, the ceramic film containing no more than about 0.5 mass % of a metallic element which is dominantly present in a surface of the metal tube; wherein,
  the ceramic film is a silicon oxide nitride film containing about 30 mass % or less of oxygen and about 10 mass % or more of nitrogen; and
  the ceramic film is an outermost layer on the exhaust pipe.

* * * * *